US008737944B2

(12) United States Patent
Kenington

(10) Patent No.: US 8,737,944 B2
(45) Date of Patent: May 27, 2014

(54) UPLINK CALIBRATION SYSTEM WITHOUT THE NEED FOR A PILOT SIGNAL

(75) Inventor: Peter Kenington, Chepstow (GB)

(73) Assignee: Kathrein-Werke KG, Rosenheim (DE)

( * ) Notice: Subject to any disclaimer, the term of this patent is extended or adjusted under 35 U.S.C. 154(b) by 726 days.

(21) Appl. No.: 12/784,745

(22) Filed: May 21, 2010

(65) Prior Publication Data

US 2011/0287728 A1    Nov. 24, 2011

(51) Int. Cl.
H04B 17/00    (2006.01)

(52) U.S. Cl.
USPC .......... 455/226.1; 455/226.2; 455/226.3; 455/562.1; 370/334; 370/335; 370/342; 375/130; 375/148; 375/260; 375/267; 375/150

(58) Field of Classification Search
USPC ......... 455/226.1, 226.3, 562.1; 370/334, 335, 370/342; 375/130, 148, 260, 267, 150
See application file for complete search history.

(56) References Cited

U.S. PATENT DOCUMENTS

| | | | |
|---|---|---|---|
| 6,031,877 A | 2/2000 | Saunders | |
| 6,282,229 B1 * | 8/2001 | Aoyama | 375/130 |
| 6,426,971 B1 | 7/2002 | Wu et al. | |
| 6,590,532 B1 | 7/2003 | Ogawa et al. | |
| 6,809,685 B2 * | 10/2004 | Hancock | 342/368 |
| 7,263,083 B2 * | 8/2007 | Kisigami et al. | 370/335 |
| 7,519,125 B2 * | 4/2009 | Maltsey et al. | 375/260 |
| 7,860,064 B2 * | 12/2010 | Kisigami et al. | 370/334 |
| 2001/0009861 A1 | 7/2001 | Martin et al. | |
| 2004/0196929 A1 | 10/2004 | Wendt et al. | |
| 2005/0147064 A1 * | 7/2005 | Nakagawa | 370/335 |
| 2006/0217091 A1 | 9/2006 | Tsukio et al. | |
| 2007/0273584 A1 * | 11/2007 | Kisigami et al. | 342/378 |
| 2011/0090813 A1 * | 4/2011 | Kisigami et al. | 370/252 |

FOREIGN PATENT DOCUMENTS

| | | |
|---|---|---|
| GB | 2239737 | 7/1991 |
| WO | 2010/060953 | 6/2010 |

OTHER PUBLICATIONS

U.S. Appl. No. 61/118,391 entitled: Calibration Apparatus and a Method for Generating for at Least One Calibration Signal for an Antenna Array, filed Nov. 26, 2008.
U.S. Appl. No. 12/751,391 entitled: Active Antenna Array and Method for Calibration of Receive Paths in Said Array, filed Mar. 31, 2010.

* cited by examiner

Primary Examiner — Junpeng Chen
(74) Attorney, Agent, or Firm — Stephen H. Eland; Dann, Dorfman, Herrell & Skillman

(57) ABSTRACT

An antenna array for a mobile communications system comprises a plurality of receive paths and a calibration signal processor. The receive paths are connected between an antenna elements and an analogue-to-digital converters. The calibration signal processor comprises a cross-analyzer for cross-analyzing the digitized receive signals of the plurality of receive paths with each other, an averager for forming a temporal average of an output of the cross-analyzer, the temporal average indicating a receive signal relationship between the digitized receive signals of the plurality of receive paths, wherein the calibration signal processor is adapted to use the temporal average of the receive signal relationship to calibrate of at least one of the plurality of receive paths. A corresponding method and corresponding computer program products usable during manufacture and operation are also disclosed.

20 Claims, 5 Drawing Sheets

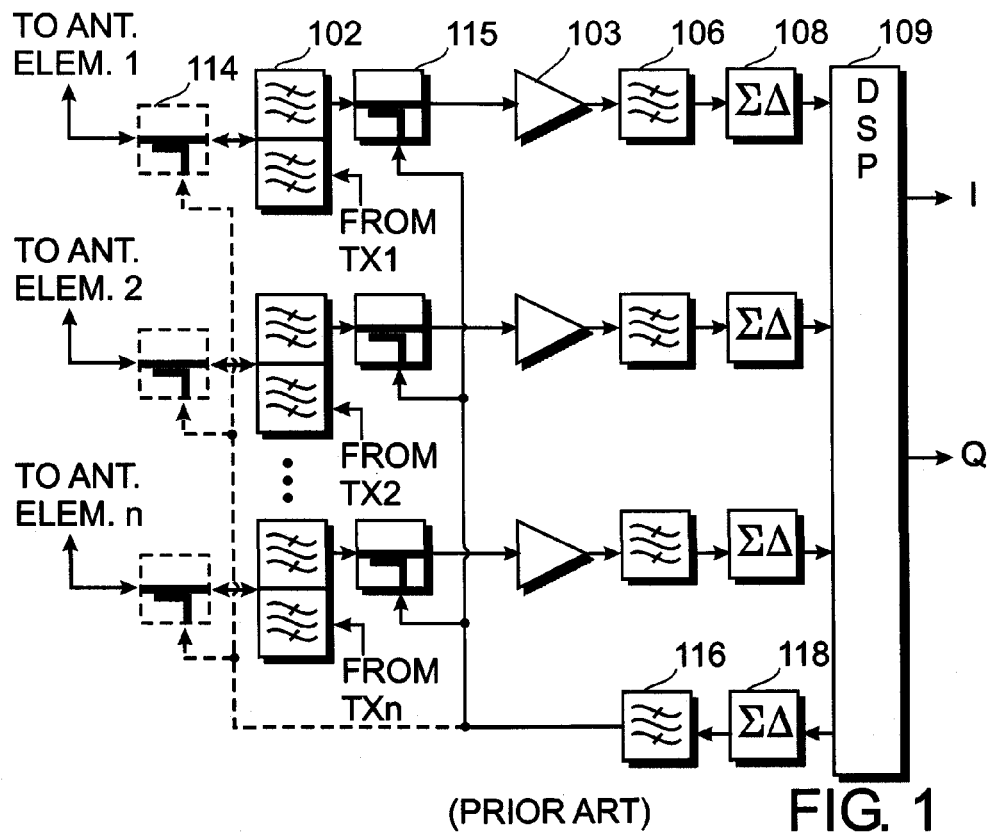
(PRIOR ART) FIG. 1
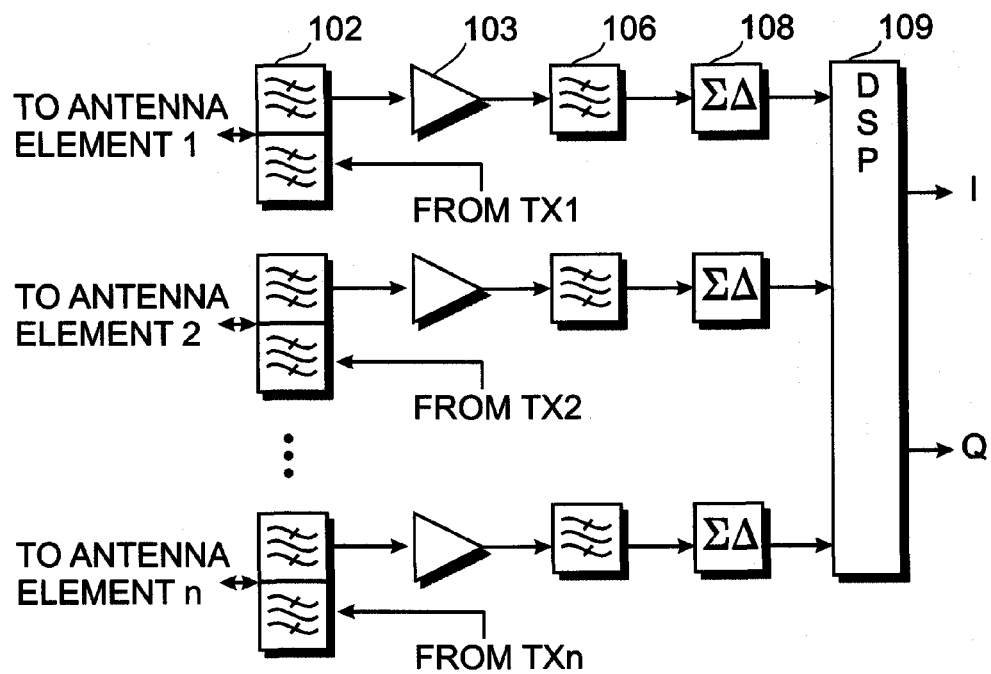
FIG. 2

UPLINK CALIBRATION SYSTEM WITHOUT THE NEED FOR A PILOT SIGNAL

CROSS REFERENCE TO OTHER APPLICATIONS

The present application is related to U.S. Provisional Application No. 61/118,391, entitled: Calibration Apparatus and a Method for Generating for at Least One Calibration Signal for an Antenna Array, filed on Nov. 26, 2008. The present application is also related to U.S. patent application Ser. No. 12/751,391, entitled: Active Antenna Array and Method for Calibration of Receive Paths in Said Array, filed Mar. 31, 2010. The entire disclosure of the foregoing patent applications is incorporated herein by reference.

FIELD OF THE INVENTION

The field of the present invention relates to an active antenna array for a mobile communications network. The field of the present invention further relates to a method for calibration of a plurality of receive paths of an active antenna array. Furthermore, the field of the present invention relates to a computer program product enabling a foundry to carry out the manufacture of the active antenna array, and to a computer program product enabling a processor to carry out the method for calibration.

BACKGROUND OF THE INVENTION

The use of mobile communications networks has increased over the last decade. Operators of the mobile communications networks have increased the number of base stations in order to meet an increased demand for service by users of the mobile communications networks. Radio signals are typically relayed into a cell of the mobile communications network, and vice versa.

It is of interest to provide a reliable quality of service to an individual user of the mobile communications network given the increase in the number of users. Several techniques have been suggested in order to deal with the increased number of users within the mobile communications network. None of the several techniques comprises beamforming capabilities in order to direct a beam relayed by the base station in different directions to improve service coverage within the cells of the mobile communications network. Beamforming may be achieved with an array of antenna elements. The beamforming techniques rely on defined phase and amplitude relations between individual ones of the antenna elements of the antenna array. A transmit path and/or a receive path is associated with at least one antenna element. Calibration of the transmit paths and/or the receive paths is required to provide the defined phase, amplitude and delay relationship between the individual ones of the antenna elements. The calibration allows the estimation of phase, amplitude and delay deviation accumulated along individual transmit paths of the antenna array. Likewise, the calibration comprises estimating phase, amplitude and delay deviations accumulated along individual ones of the receive paths. In a second step, the phase, amplitude and delay deviation accumulated along the transmit paths can be corrected. An appropriate phase and amplitude change may be imposed or applied to the individual transmit/receive paths to yield the defined phase and amplitude relationship between the individual transmit/receive paths of the antenna array, in order to allow for beamforming techniques.

The transmit paths and/or the receive paths typically differ slightly in their behavior towards amplitude, phase, and delay. These differences may be caused, for example, by different signal path lengths from one transmit path and/or receive path to another. For meaningful beamforming to be possible, these differences must be taken into account, i.e., the antenna array needs to be calibrated so that each antenna element relays an assigned portion of the radio signal in a desired and expected manner. The term "relaying" applies to the uplink direction or to the downlink direction or to both.

In the past, the calibration of an antenna array often used a calibration signal or "sounding" signal. FIG. 1 shows a basic outline of a receive-path calibration system based on a calibration signal for use in an active antenna array. The active antenna array comprises a plurality of transceive paths 1 to n. In FIG. 1, only three of the transceive paths are illustrated, for the sake of clarity. Furthermore, only the receive paths are shown in FIG. 1, but not the transmit paths. Taking the transceive path 1 as an example, transceive path 1 is connected to an antenna element (not shown) at the left. A receive signal picked up by the antenna element passes a signal coupler substantially unchanged. The receive signal then reaches a duplex filter which acts to inject the receive signal into an actual receive path. The duplex filter functions on the basis of frequency filtering and separates a frequency spectrum reserved for the receive band from a frequency spectrum reserved for the transmit band (from the perspective of a base station). In FIG. 1, the receive path comprises a further signal coupler, which will be explained later. The receive path also comprises a low noise amplifier (LNA), a bandpass filter, and a delta-sigma analogue-to-digital converter. These three components of the receive path provide for amplification, filtering, frequency conversion, and digitalization of the receive signal to provide a digitized receive signal. The digitized receive signal is supplied to a digital signal processor (DSP) for further processing, such as descrambling and distribution to a plurality of user channels.

The digital signal processor is also used for generating a calibration signal. In the arrangement shown in FIG. 1, the DSP generates a calibration signal at baseband or at an intermediate frequency (IF), which is then frequency converted by means of a delta-sigma digital-to-analogue converter to a radio frequency (RF). A bandpass filter at the output of the delta-sigma digital-to-analogue converter filters the up-converted calibration signal and in particular removes any undesired quantization noise produced by the delta-sigma digital-to-analogue converter. The up-converted calibration signal is now provided to one of the signal couplers to the left and the right of the duplex filter. Clearly, the left signal coupler shown in dashed line illustrates an alternative embodiment. Whilst it is clearly possible to inject the required calibration signal at any point in the receive paths, the two most likely locations are shown in FIG. 1. Note that both locations would normally not be used simultaneously, although it is possible that the calibration signal could be switched from one to the other, e.g. for a factory calibration of the whole system, using the leftmost coupler, versus an operational calibration of the low noise amplifiers, analogue-to-digital converters, etc., using the right-hand of the two couplers.

The signal couplers are designed for a major portion of the calibration signal to be injected in the receive direction, i.e., to the right in FIG. 1. Ideally, only a very small fraction of the calibration signal is injected in the transmit direction, i.e., from right to left. Injecting the calibration signal in the transmit direction could lead to undesired reflections at the antenna element and/or the duplex filter, or it could be radiated by means of the antenna element to the environment. The portion of the calibration signal that has been injected into the receive path in the receive direction undergoes the same signal processing as the receive signal. Once the calibration signal has made its way back to the digital signal processor, the digital signal processor extracts the calibration signal from the rest of the receive signal. By comparing the originally generated calibration signal with the calibration signal as received from the receive path 1, it can be determined how the receive path modifies the amplitude, phase, and delay of the receive signal.

In an active antenna array used for beamforming, one is mostly interested in relative differences between the transmit paths and/or receive paths. Therefore, it is not necessary to know how the delta-sigma digital-to-analogue converter and the bandpass filter in the calibration signal path modify the calibration signal in absolute terms. Indeed, any modification of the calibration signal in the calibration signal path will practically be the same for all of the transceive paths (with the exception of the mentioned relative differences) and therefore will not have a significant influence on the determination of the relative differences between the transceive paths.

The known calibration scheme works well, but requires a significant amount of additional hardware, in particular a signal coupler in each receive path. Moreover, from the perspective of the receive signals, the calibration signal is noise and therefore reduces the signal-to-noise ratio (SNR) of the receive paths, at least while calibration of a particular receive path is taking place.

US Patent Application Publication 2001/0009861 A1, titled "Bootstrapped, Piecewise-Asymptotic Directivity Pattern Control Mechanism Setting Weighting Coefficients of Phased Array Antenna" and assigned to Harris Corporation, describes an alternative method. In US 2001/0009861, weighting coefficients for a phased array antenna are iteratively refined to optimal values by a "bootstrapped" process that starts with a coarse set of weighting coefficients, to which received signals are subjected, to produce a first set of signal estimates. These estimates and the received signals are iteratively processed a prescribed number of times to refine the weighting coefficients, such that the gain and/or nulls of antenna's directivity pattern will maximize the signal-to-noise ratio. The method comprises, amongst others, the generation of signal transforms, the generation of a noise-signal matrix, the generation of covariance matrices, and the calculation of a matrix product. Accordingly, data processing needed for performing the method proposed in US 2001/0009861 A1 is rather involved. Furthermore, the method provides "lumped" weighting coefficients that are valid for a particular user. The method does not appear to provide for a determination of a constant, systematic deviation between the data processing of the various receive paths.

U.S. Pat. No. 6,031,877, assigned to Motorola, Inc., discloses an apparatus and method for adaptive beamforming in an antenna array. A predictive filter supplies an estimate of receive signal samples likely to be received in a burst immediately preceding a transmission. Combination of this estimate with received signal samples obtained from actual (historically received) signals, received over a predetermined number of frames, yield estimates of optimum beamforming coefficients for application to data for transmission from an adaptive array of antenna elements. The method comprises, amongst others, the calculation of a received signal cross-correlation matrix with respect to a received signal vector at n branches (i.e. n antenna elements). As was the case with US 2001/0009861 A1, U.S. Pat. No. 6,031,877 does not appear to disclose that e.g. the phase differences between two receive paths comprise constant, systematic differences which are due to the imperfections of manufacture of the various receive paths or environmental influences such as different temperatures.

SUMMARY OF THE INVENTION

This disclosure provides for an active antenna array for a mobile communications system that comprises a plurality of receive paths. An individual one of the receive paths is connected between an antenna element and an analogue-to-digital converter, whereby the analogue-to-digital converter digitizes a receive signal to form a digitized receive signal. A calibration signal processor is connected to the analogue-to-digital converters of the plurality of receive paths. The calibration signal processor comprises a cross-analyzer for cross-analyzing the digitized receive signals of the plurality of receive paths with each other (or among each other). The calibration signal processor also comprises an averager for forming a temporal average of an output of the cross-analyzer, the temporal average indicating a receive signal relationship between the digitized receive signals of the plurality of receive paths. The calibration signal processor is adapted to use the temporal average of the receive signal relationship to correct a calibration of at least one of the plurality of receive paths.

The receive signal relationship may be regarded and therefore modeled as comprising a random portion depending on, e.g. the spatial distribution of users in the cell, where movements, and randomness of possible propagation paths between the mobile station and the active antenna array can be observed. The receive signal relationship may also comprise a non-random portion which is mostly due to systematic and constant differences between two receive paths within the plurality of receive paths. It is also possible that the differences between the two receive paths are evolving slowly, for example because of aging effects and temperature effects. These slowly-varying differences may be regarded as quasi-constant for the purpose of the teachings disclosed herein. When observed over a sufficiently long time it can be observed that the random portions of the differences obey to a certain distribution, such as a Gaussian distribution having a specific mean value and a specific standard deviation. Under certain circumstances, the statistical distribution may even be centered at zero.

The averager allows the determination of the mean value of the statistical distribution. The averager may optionally also be used for determining further statistical parameters of the distribution. On the basis of the mean value of the statistical distribution (that is, the temporal average output by the averager) and possibly a priori knowledge about the statistical distribution, it is possible to determine constant or quasi-constant differences in the signal processing of the plurality of receive paths.

If the non-random differences between the receive paths have been determined with sufficient accuracy, this knowledge can be used to calibrate the plurality of receive paths. It is equally possible to use the determined values for the non-random differences to correct the calibration of the plurality of receive paths.

Prior art calibration schemes have apparently not exploited the fact that the differences in the receive signals within the plurality of receive paths are only partially random, the other portion being deterministic. Furthermore, the random portion of the receive path differences is often correlated over the receive paths. The reason for this is that the antenna elements of the plurality of receive paths have a certain spatial relationship with respect to each other. Therefore, a signal or a wave front that arrives at the active antenna array from a certain direction will give rise to specific phase relations between the receive paths, at least with respect to the random portion that depends on the direction from which the received signal arrives.

In one aspect of the invention, the antenna elements may be equally spaced, preferably by a distance equal to or greater than half a wavelength of the receive signal. For example, the antenna element may form a grid. By a spacing the antenna elements having a wavelength of half the receive signal's wavelength or more than that, efficient beamforming is possible in the downlink and uplink directions. The receive signals observed on the various receive paths are correlated in a regular manner if the antenna elements are equally spaced. Therefore, these measures may improve the processing of the receive signals for communication purposes as well as calibration purposes.

It is possible to use different types of receive signal relationships. The receive signal relationship could, for example, comprise at least one of a phase relation between the receive paths and an amplitude relation between the receive paths. Especially the phase relation between the receive paths is relevant for the concept of beamforming. Some types of beamforming may also use the amplitude relation between the receive paths or a combination of both the amplitude relationship and the phase relationship.

In another aspect of the disclosure, the active antenna array may further comprise a comparator for comparing the receive signal relationship with a predetermined relationship and for determining a deviation between the receive signal relationship and the predetermined relationship. The predetermined relationship may be, for example, a calculated mean value of the statistical distribution of the receive path differences. The predetermined relationship represents a statistical parameter (e.g. mean value) of the distribution of the random aspects of the receive path differences. The deviation between the receive signal relationship and the predetermined relationship may therefore be regarded as a good guess for deterministic receive path differences.

The calibration signal processor may be adapted to use the deviation as a correctional value to correct the calibration of at least one the at least two receive paths. The deviation may be observed between an actual receive signal relationship and the predetermined relationship between two of the plurality of receive paths. The deviation can be regarded as an estimate of a systematic difference in the signal processing between the two considered receive paths.

In a further aspect of the invention, the calibration signal processor further comprises an estimator for estimating the predetermined relationship. The estimator makes is possible to obtain a value for the predetermined relationship during an operation of the active antenna array. In the alternative, the predetermined relationship may be calculated or simulated on the basis of, for example, theoretical considerations and/or field studies. For example, the propagation pattern at a site of the base station could be simulated or measured. The predetermined relationship may, for example, state that the distribution of the direction of arrival of the receive signals is likely to be centered with respect to a particular direction and exhibits a certain standard deviation. For example, the direction of arrival of the receive signals may be inclined a few degrees down from boresight of the active antenna array, especially if the active antenna array is mounted on a pole and the mobile stations are most likely to be close to the ground, so that in urban areas the receive signals may be reflected several times on their way from the mobile station to the active antenna array. In an environment with relatively high buildings, the receive signals might even arrive from above boresight of the active antenna array.

One of the plurality of receive paths may be a reference path. The estimator may comprise a function fitting module for fitting a plurality of receive signal relationships between the reference path and other ones of the receive paths, and for estimating the predetermined relationship based on a function parameter of a function fitted to the plurality of receive signal relationships. The receive signal relationships are determined for each receive path with respect to the reference path. In this manner, a set of relative receive signal relationships may be obtained. In an active antenna array, the receive signals that are present on the plurality of receive paths are usually correlated somehow. Therefore, receive signal relationships that are suitably chosen may also be considered to be correlated to each other. For example, in an active antenna array with equidistant spacing, the phase difference of the receive signals in two adjacent receive paths could be substantially the same across the active antenna array, at least under ideal conditions. It might be possible to model a function that describes the receive signal relationships for each path with respect to the reference path. For example, the phase relation of the receive paths at a particular point in time could be modeled as a straight line (valid for far-field propagation). The function fitting module may use the receive signal relationships as samples and fit a straight line through the samples, for example by using a least mean squares (LMS) method. The fitted function may then indicate a good estimate of the predetermined relationships by evaluating the value of the fitted function for a particular receive path of interest.

In a further aspect of the teachings disclosed herein, the active antenna array further comprises an adaptive filter for removing effects of at least one of a gain ripple and a phase ripple of analogue filters in the plurality of receive paths. The gain ripple and/or the phase ripple could affect the result of the calibration of the receive paths. For the purposes of calibrating the receive paths, a narrow-band signal might be sufficient. The adaptive filter could be e.g. a tunable filter so that calibration can be performed for a plurality of carrier waves having different frequencies or for a carrier wave with variable frequency. The adaptive filter may be located in a signal path that is dedicated to calibrating the active antenna array. For example, the adaptive filter could be implemented as part of a software algorithm used by a digital signal processor (DSP). The removal of the effects of gain/phase ripple of analogue filters is expected to improve the performance of the calibration process.

The disclosure also teaches a method for calibration of a plurality of receive paths carrying receive signals. The method comprises cross-analyzing the receive signals of the plurality of receive paths with each other, forming a temporal average of a result of the cross-analysis, the temporal average indicating a receive signal relationship between the receive signals of the plurality of receive paths, and using the temporal average of the receive signal relationship to correct a calibration of the plurality of receive paths.

The receive signals are external to the antenna. The antenna typically has no control over the receive signals. The generation of the receive signal is typically physically separated from the antenna and its support structure. The receive signals may, for example, constitute actual communications signals exchanged between a mobile station and the active antenna array. The receive signals are also used for the calibration of the receive paths. Therefore, no dedicated sounding signal or pilot signal is needed.

In one aspect of the teachings disclosed herein, the receive signals are received via an antenna array having antenna elements that are equally spaced, preferably by a distance equal to or greater than half a wavelength of the receive signal.

The receive signal relationship may comprise at least one of a phase relationship between the plurality of receive paths and an amplitude relationship between the plurality of receive paths.

The method may further comprise: comparing the receive signal relationship with a predetermined relationship and determining a deviation between the receive signal relationship and the predetermined relationship.

In a further aspect of the teachings disclosed herein, the method further comprises: using the deviation as a correctional value to correct the calibration of the plurality of the receive paths.

The method may further comprise: estimating the predetermined relationship.

In an aspect of the teachings disclosed herein, the plurality of receive paths comprises a reference path. The method may further comprise: fitting a plurality of receive signal relationships to a function, and estimating the predetermined relationship based on a function parameter of a function fitted to the plurality of receive signal relationships. The function parameter could be, for example, a slope or a coefficient of a mathematical representation of the fitted function. In the alternative, the predetermined relationship could be estimated directly by evaluating the fitted function at a particular value of the abscissa, for example at a value that is representative of a particular antenna element and thus a particular receive path.

The method may further comprise filtering the receive signals by means of an adaptive filter for removing the effects of at least one of a gain ripple and a phase ripple of analogue filters in the plurality of receive paths.

The disclosure also teaches a computer program product comprising a non-transitory computer-usable medium, such as but not limited to solid-state memory or a removable storage medium, having control logic stored therein for causing a computer to manufacture an active antenna array for a mobile communications network comprising: a plurality of receive paths, an individual one of the receive paths being connected between an antenna element and an analogue-to-digital converter, the analogue-to-digital converter digitizing a receive signal to form a digitized receive signal, a calibration processor connected to the analogue-to-digital converters of the plurality of the receive paths, wherein the calibration signal processor comprises:

a cross-analyzer for correlating the digitized receive signals of the plurality of receive paths with each other, an averager for forming a temporal average of an output of the cross-analyzer, the temporal average indicating a receive signal relationship between the digitized receive signals of the plurality of receive paths, wherein the calibration signal processor is adapted to use the temporal average of the receive signal relationship to correct the calibration of at least one of the plurality of receive paths.

In a further aspect of the invention, a computer program product is disclosed which comprises non-transitory computer-useable medium, such as but not limited to solid-state memory or a removable storage medium, having control logic stored therein for causing an active antenna to execute a method for calibrating a plurality of individual radio signals comprising:

cross-analyzing the receive signals of the plurality of receive paths with each other, forming a temporal average of a result of the cross-analysis, the temporal average indicating a receive signal relationship between the digitized receive signals of the plurality of receive paths, inducing the temporal average of the receive signal relationship to correct a calibration of at least of the at least two receive paths.

BRIEF DESCRIPTION OF THE DRAWINGS

FIG. 1 shows a schematic block diagram of an active antenna array of the prior art.

FIG. 2 is a schematic block diagram of an active antenna array according to the teachings disclosed herein.

DETAILED DESCRIPTION OF THE INVENTION

Figure 3:
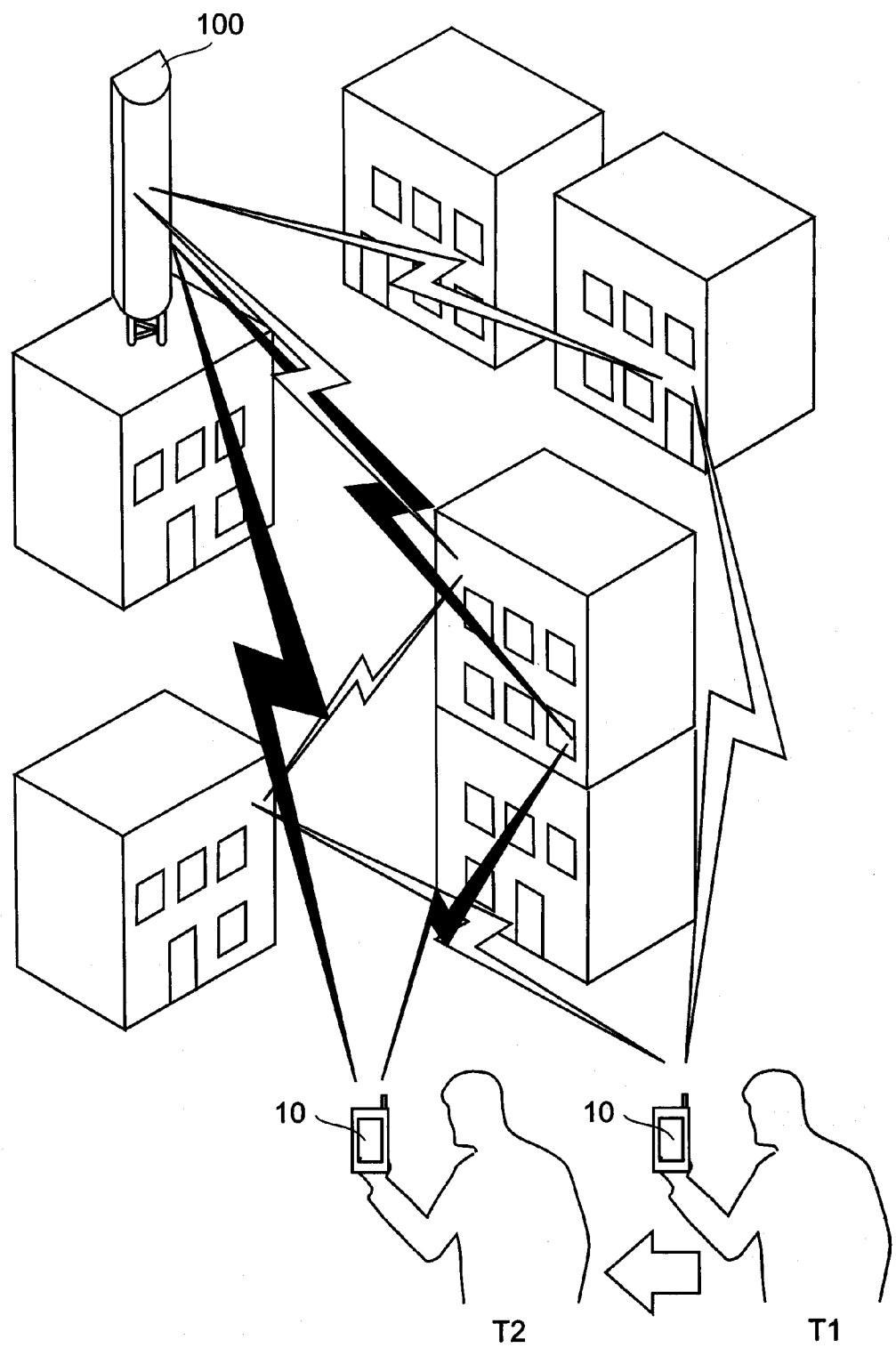
FIG. 3 shows an exemplary urban environment in which the active antenna array may be used.

The invention will now be described on the basis of the drawings. It will be understood that the embodiments and aspects described herein are only examples and do not limit the protective scope of the claims in any way. The invention is defined by the claims and their equivalents. It will also be understood that features of one aspect can be combined with features of a different aspect.

FIG. 1 shows a basic outline of a current type of receive-path calibration system for use in an active antenna array (employing delta-sigma ND converters). The active antenna array comprises a plurality of combined transmit and receive paths (transceive paths). In FIG. 1, three transceive paths are shown. Each of the plurality of transceive paths is connected to a particular antenna element. Each transceive path comprises a duplex filter 102 close to its end where the transceive path connects to the antenna element. The duplex filter 102 separates a transmit band from a receive band in the frequency domain. In FIG. 1, only the receive paths of the plurality of transceive paths are shown in more detail. The receive paths comprise a low-noise amplifier (LNA) 103, a bandpass filter 106, and a delta-sigma analogue-to-digital converter 108. The LNA 103 and the bandpass filter 106 condition, in the analogue domain, a receive signal handled by the receive path. The delta-sigma analogue-to-digital converter 108 digitizes the receive signal to form a digitized receive signal which is then fed to a digital signal processor (DSP) 109. The digital signal processor 109 performs further signal processing on the digitized receive signal and provides a quadrature signal having an in-phase component I and a quadrature component Q. The quadrature signal may be provided at a baseband frequency or at an intermediate frequency.

In the transmit direction, a plurality of transmit paths is provided which are not shown in FIG. 1. Each of the plurality of transmit paths generates an analogue transmit signal at radio frequency which is fed to the duplex filter 102 of the corresponding transceive path. This is illustrated in FIG. 1 by the arrows ending at the duplex filter 102 labeled "from TX1" etc.

The receive paths of the active antenna array shown in FIG. 1 usually differ slightly in the influence they have on the receive signals. In particular, the attenuation or gain may vary from one receive path to another, which has an influence on the amplitude of the receive signal at the end of the receive path, i.e. the amplitude of the digitized receive signal just prior to feeding the digitized receive signal to the DSP 109. The receive signals may also vary with respect to a phase shift imposed on the plurality of receive signals. These differences between the receive paths may be due to, for example, different signal path lengths. The interest of having an array of several antenna elements and corresponding receive paths is that such a structure offers superior control over the directivity pattern of the antenna than a simple antenna having only one antenna element. However, for this directivity control to function properly, the receive paths need to show sufficiently similar behavior with respect to attenuation and, in particular, phase shift. Any remaining differences between the receive paths may be compensated for by means of a calibration system. The calibration system may either act on the plurality of receive paths directly, for example by means of adjustable phase shifters and/or attenuators, or the calibration system may adjust any digital processing performed by the DSP 109 in order to take the differences between the receive paths into account.

The calibration system of the active antenna array shown in FIG. 1 uses a sounding signal or pilot signal that is applied to the inputs of the receive paths. The pilot signal is generated by the DSP 109, digital-to-analogue-converted by a delta-sigma digital-to-analogue converter 118, and filtered by a bandpass filter 116. The delta-sigma digital-to-analogue converter 118, in conjunction with the DSP 109, also provides for a frequency conversion from a baseband frequency to a radio frequency. The pilot signal is then distributed to the inputs of the receive paths in such a manner that the pilot signal substantially looks the same for each of the plurality of receive paths. This is achieved by a plurality of couplers 115. Note that FIG. 1 also illustrates an alternative placement of the coupler 114 between the antenna elements and the duplex filters 102. Whilst it is clearly possible to inject the required pilot signal at any point in the receive paths, the two most likely locations are shown in FIG. 1. Note that those locations would not be used simultaneously, although it is possible that the calibration signal, i.e. the pilot signal, could be switched from one to the other, e.g. for a factory calibration of the whole system, using the left-most coupler 114, versus an operational calibration of the LNAs, A/Ds etc., using the couplers 115.

In FIG. 1, the calibration signal is shown as being generated within the DSP 109. However, it is also possible for it to be generated separately and sampled by an analogue-to-digital converter for feeding it to the DSP (within which the calibration signal correlation and calibration processing is assumed to take place).

Once injected into the plurality of receive paths, the calibration signal undergoes the same kind of signal processing as the receive signals. In the DSP 109, a correlation between the original calibration signal and the combined signals of receive signals and transformed calibration signal is performed. The correlation makes apparent a relation between the original calibration signal and the transformed calibration signal, such as a phase difference, for each of the receive paths. This result may then be used to calibrate the plurality of receive paths.

FIG. 2 shows a schematic block diagram of an active antenna array according to the teachings disclosed herein. The active antenna array shown in FIG. 2 differs from the active antenna array shown in FIG. 1 in that no hardware is present for injecting a calibration signal into the plurality of receive paths. Accordingly, the active antenna array shown in FIG. 2 does not comprise a delta-sigma digital-to-analogue converter 118, a bandpass filter 116, and signal couplers 114, 115. The calibration of the plurality of receive paths of the active antenna array shown in FIG. 2 is undertaken within the DSP 109. The calibration is based on an analysis of the receive signals themselves, rather than on the analysis of the calibration signal, as was the case in FIG. 1. For example, the DSP 109 may perform a cross-analysis of the receive signals issued by the plurality of receive paths. Note that for the purposes of calibration it is typically sufficient for the receive paths to be calibrated in a manner relative to each other.

It can be seen that the proposed uplink calibration system for the active antenna array shown in FIG. 2 removes the need for directional couplers and hence eliminates their detrimental impact upon system noise figure. The proposed uplink calibration system also eliminates the possibility of a pilot signal being re-radiated from the antenna due to imperfections in the directivity of the coupler and/or reflections caused by an imperfect match at the LNA input. The architecture shown in FIG. 2 is, in effect, a "standard", unmodified set of receiver signal processing chains (one per antenna element).

FIG. 3 shows how the angle of arrival of the signals from a single user can vary with time as that user moves within a cell. Note that between times T1 and T2, the user has moved only a short distance, but the paths of the signals emanating from his handset 10 and arriving at the base transceiver station (BTS) 100 antenna have changed dramatically; the signal phases will, likewise, have undergone a dramatic change, thereby underlining the randomness of the process involved. This process is repeated for all users in the cell, both those close to the mast and those distant from it (thereby covering a range of "average" arrival angles) and this behavior, together with the non-static nature of a typical environment (e.g. the movement of cars, busses, and other radio blockers/reflectors) greatly adds to the randomness of the phases of the signals arriving at a given antenna element over a time. It is this randomness, spread across all of the antenna elements, which should remove, on average, the effect of the physical path difference between the antenna elements, which would in the case of a static, single user bias the calibration incorrectly. Clearly in the case of a very small number of users, the calibration system would need to sustain for a time, and this process could be automated, since the BTS will know how many users it has and hence can control the initiation or suspension of calibration. The calibration process is likely to require only occasional updating, since the calibration coefficients will not change rapidly (or significantly) over time.

Figure 4:
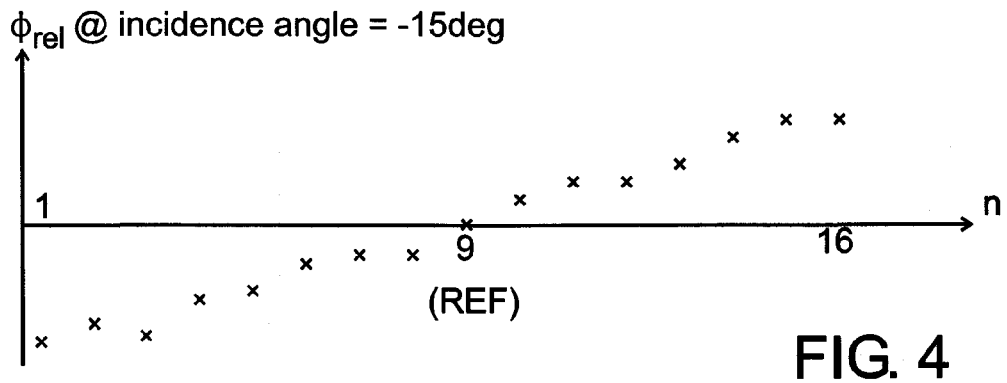
FIG. 4 shows exemplary measurements of receive signal relationships at a first angle of incidence of the receive signal.
Figure 5:
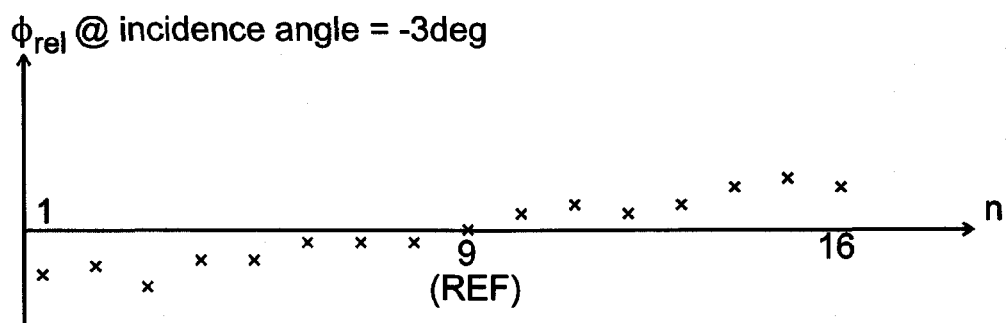
FIG. 5 shows exemplary measurements of receive signal relationships at a second angle of incidence of the receive signal.
Figure 6:
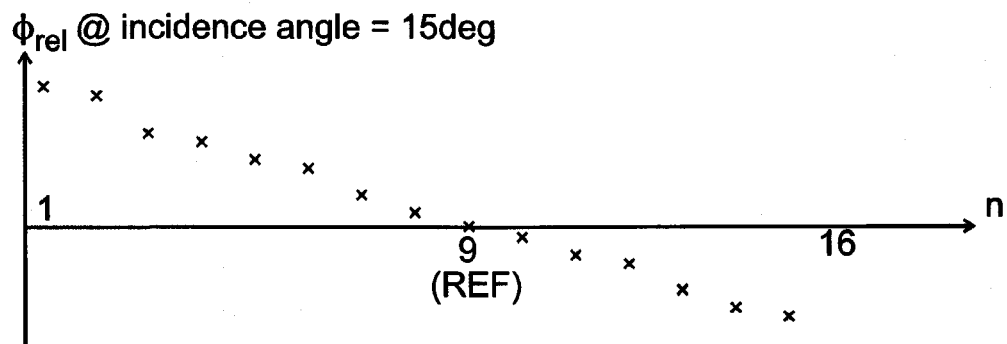
FIG. 6 shows exemplary measurements of receive signal relationships at a third angle of incidence of the receive signal.

FIGS. 4 to 6 show graphs of the relative phase of the receive signals within the plurality of receive paths. One of the receive paths has been chosen as a reference path, in this case receive path 9, the corresponding antenna element of which being typically in the middle of a 1-by-16 array of antenna elements. Note that the 1-by-16 array is used as an illustrative example, only. Clearly, active antenna arrays with other dimensions may equally benefit from a calibration system as disclosed herein. For example, a 2-by-8 array may be used in which a central antenna element (e.g. antenna element no. 4 or antenna element no. 12) is chosen as the reference antenna element.

FIG. 4 shows measured values of the relative phase $phi_{rel}$ as observed for an angle of incidence (angle of arrival) of −15°. The relative phase of receive path 1 with respect to the reference receive path 9 is negative. At the other side of the array, the relative phase $phi_{rel}$ of the receive signal within receive path 16 is positive with respect to the reference receive path 9. Between the receive signals of receive path 1 and receive path 16, the measurements of the relative phases $phi_{rel}$ follow more or less a linear dependency. The measurements may deviate from a fictional, ideal linear dependency by deviations that may be due to imperfections of the plurality of receive paths, at least in part. Note that the relative phase $phi_{rel}$ for receive path 9 is always zero, per definition, because receive path 9 acts as the reference path.

FIG. 5 shows another graph of measured values for the relative phase $phi_{rel}$ as a function of the receive paths for an angle of arrival of −3°. In comparison to the graph shown in FIG. 4, the slope of a fictional straight line through the samples is more shallow than in FIG. 4. The reason is that the receive signals arrive almost simultaneously at the plurality of antenna elements so that only small phase differences occur from one receive path to the next receive path.

FIG. 6 shows yet another graph of measured values of the relative phase $phi_{rel}$ as the function of the receive paths. The angle of arrival of the receive signal at the active antenna array is +15° for FIG. 6, indicating that the signal emanates from above the antenna boresight. The slope of a fictional line drawn through the samples is negative which means that the receive signal first arrives at the antenna element corresponding to receive path 1.

As mentioned above, the angle of arrival observed at the active antenna array is random, especially in an environment having radio blockers and/or radio reflectors, such as buildings. Therefore, the active antenna array will typically observe continuously varying angles of arrival. This will lead to continuously changing measurements of the relative phase for a given receive path with respect to the reference receive path.

Figure 7:
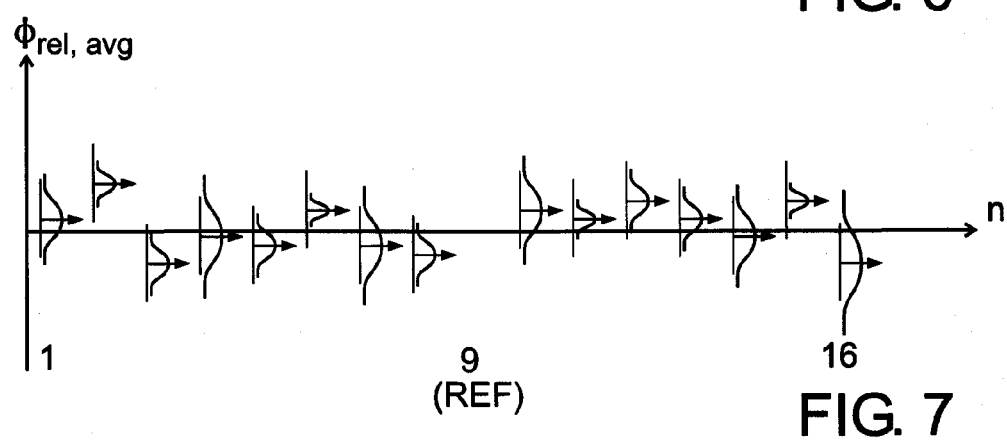
FIG. 7 shows in a schematic manner a result of a statistical analysis of the measured receive signal relationships.

FIG. 7 shows a statistical representation of the randomness of the relative phase $phi_{rel}$ as a function of the receive paths 1 to 16. Averaging the measured relative phases $phi_{rel}$ for a given receive path with respect to the reference receive path over time leads to statistical parameters such as mean value and standard deviation. Taking receive path 1 as an illustrative example, it can be seen that the mean value of the relative phase $phi_{rel}$ is close to zero and just slightly biased to the positive side. The graph of FIG. 7 also indicates the standard deviation as a height and a shape of the Gaussian curve drawn at the position corresponding to receive path 1.

Taking receive path 16 as another illustrative example, it can be seen that the mean value of the measured relative phases $phi_{rel}$ for receive path 16 has a large negative value. Furthermore, the Gaussian curve for the distribution of measured values of the relative phase $phi_{rel}$ is rather broad for receive path 16. This means that the relative phase $phi_{rel}$ of receive path 16 with respect to the reference receive path has a large standard deviation, i.e. it is highly random.

The findings illustrated in FIG. 7 may be used for the purposes of calibration in the following manner. Let us assume that the angle of arrival is zero degrees on average. This assumption can be made, for example, if the active antenna array is installed in an urban environment in which users may also be present above the installation height of the active antenna array, because they are in high-risers, skyscrapers, and/or tower blocks. Another reason may be that signals sent out from users' handsets can be reflected by the high-risers, skyscrapers, and/or tower blocks. With an average angle of arrival of 0°, the relative phase between the receive paths is also zero on average (note that this assumption may not be true for near-field; however, users are typically located far enough from the active antenna array so that a far-field propagation may be assumed). This knowledge about the theoretical average of the relative phase $phi_{rel}$ of the plurality of receive paths with respect to the reference receive path may be used to compare the theoretical average relative phase with the average of the actually measured relative phases for the receive path in question. The difference between the theoretical average and the actually measured average may indicate that the receive path in question is incorrectly calibrated, when compared to the calibration of the reference receive path. The calibration of the receive path in question may thus be adjusted as a function of the determined deviation between the theoretical average and the actually measured average.

Figure 8:
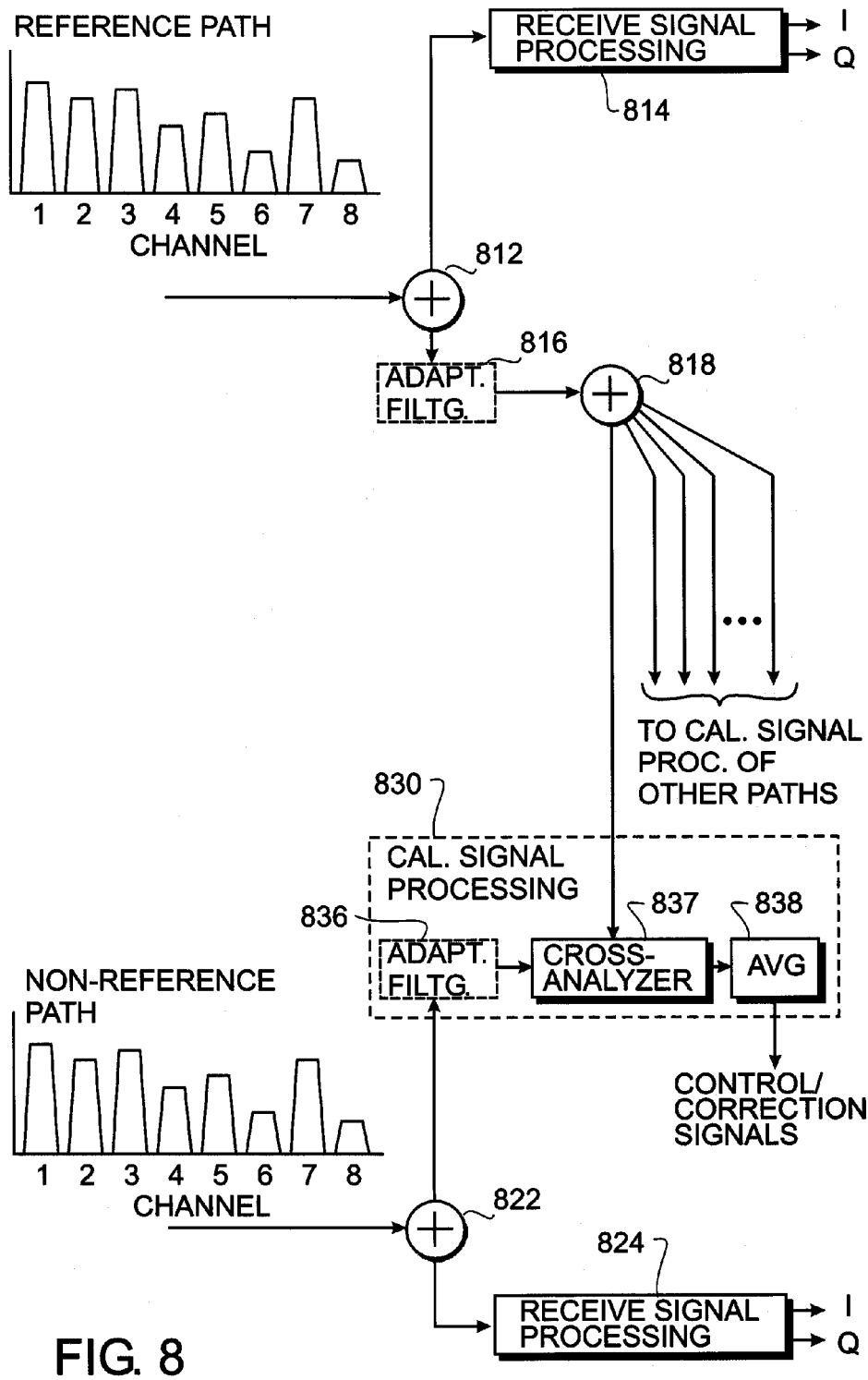
FIG. 8 shows a schematic block diagram of some details of the calibration system.

FIG. 8 shows the digital signal processing architecture proposed to allow the use of the receive signals themselves for calibration purposes. The calibration system works by exploiting the "random" nature of the received signal phases over a time (i.e., as different users move around in a cell). If the phase distribution over a time, T, is assumed to be completely random about a mean value, which represents "zero" phase, then the received signals from one antenna element can (again) be used as a reference and use themselves as the basis for calibrating the remaining receive signal processing paths.

The schematic block diagram in FIG. 8 shows a part of the signal processing that is performed in the reference path in the upper path of the drawing. The reference path processes a reference receive signal. The reference receive signal has already been digitized and possibly split up into a plurality of channels, wherein each channel may represent the receive signal portion received from a particular user or mobile station (handset). The reference receive signal is split up into two parts at a splitter 812. One part of the reference receive signal is fed to a receive signal processing unit 814 in which it undergoes standard signal processing to form the quadrature receive signal I, Q. The other part of the reference receive signal is optionally fed to an adaptive filter 816. The adaptive filter 816 is adapted to remove effects of gain/phase ripple of analogue filters. The reference receive signal, optionally filtered, is then fed to a splitter 818 which distributes the reference receive signal to calibration signal processing units of the other of the plurality of receive paths, i.e. the non-reference receive paths.

A portion of one exemplary non-reference receive path is schematically illustrated in the lower part of the block diagram of FIG. 8. The non-reference receive path carries a digitized receive signal. Possibly, the digitized receive signal has already undergone a channel separation as explained above with respect to the reference receive path. The digitized receive signal is distributed to two branches by a signal splitter 822. Note that the signal splitters 812, 818, and 822 split digital signals and are usually implemented within the DSP 109. Therefore, a signal splitting action performed by the signal splitters, 812, 818, and 822 may be implemented, for example, simply by reading out the digitized receive signal from a memory location within the DSP 109. One part of the digitized receive signal output by signal splitter 822 is forwarded to a receive signal processing unit 824 for the non-reference receive path. As in the case for the reference receive path, the receive signal processing unit 824 produces a quadrature output signal I, Q. Another part of the digitized receive signal output by signal splitter 822 is forwarded to a calibration signal processing unit 830. The calibration signal processing unit 830 optionally comprises an adaptive filter 836 for the same purposes as mentioned in the context of the description of the reference receive path. The calibration signal processing unit 830 further comprises a cross-analyzer 837. The cross-analyzer 837 has a second input by which the digitized reference receive signal is fed to the cross-analyzer 837. The cross-analyzer 837 compares the receive signal and the reference receive signal to determine a value for a parameter that describes a receive signal relationship between the receive signal and the reference receive signal. As an example, the cross-analyzer 837 could determine a value for the relative phase $\mathrm{phi}_{rel}$ between the receive signal and the reference receive signal. The cross-analyzer may be implemented as a correlator or a phase detector, where phase information is desired, or a comparator, where relative amplitude information is desired, or a combination of the two, to yield both phase difference and amplitude difference information. The value for the receive signal relationship output by cross-analyzer 837 may vary continuously, due to movement of the user, for example. An averager 838 calculates a temporal average for the value of the receive signal relationship. This average value may then be used as a control and/or correction signal for the calibration system. It would also be possible that the temporal average undergoes further processing after which the control and/or correction signals for the calibration system are obtained.

Figure 9:
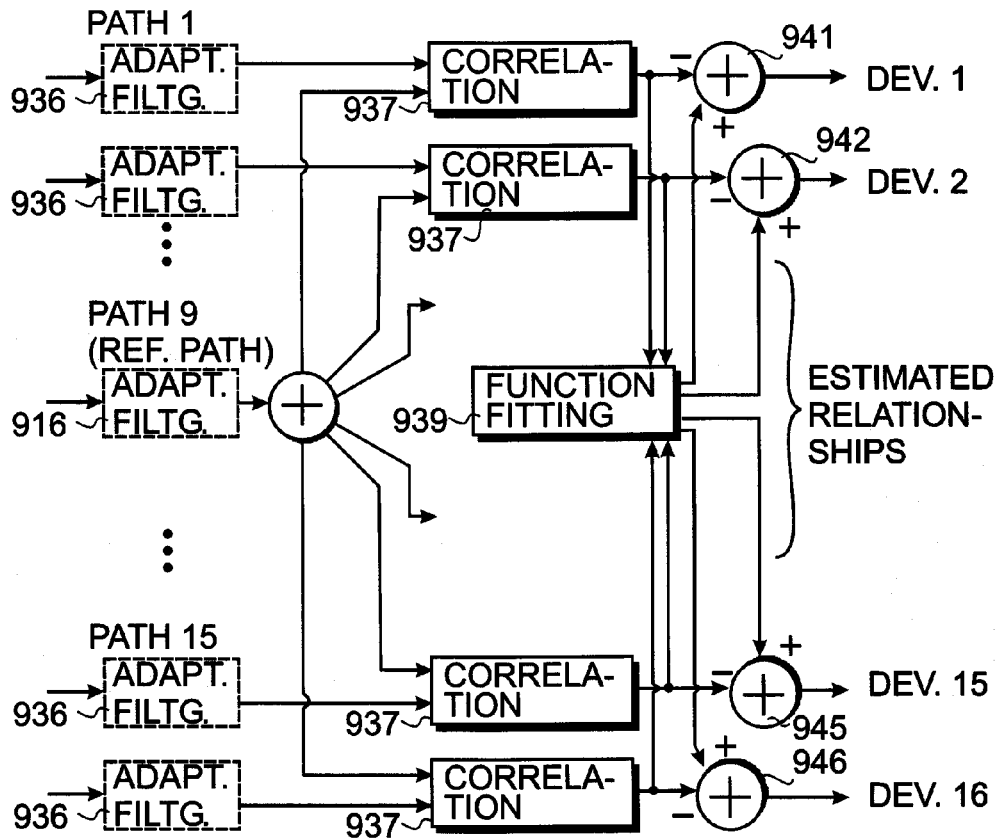
FIG. 9 shows a schematic block diagram of further details of a calibration system according to an embodiment of the teachings disclosed herein.

FIG. 9 shows another variation of a calibration system for an active antenna array. The structure illustrated in FIG. 9 may be implemented in software in the DSP 109. Alternatively, it could be implemented in hardware or as a combination of dedicated hardware and DSP-implementation. The calibration system comprises a plurality of processing paths corresponding to the plurality of receive paths. The exemplary structure shown in FIG. 9 comprises 16 processing paths. The calibration system could comprise more or fewer processing paths. For ease of illustration, only four processing paths are shown in FIG. 9, mainly processing path 1, processing path 2, processing path 15, and processing path 16. Note that receive path 9 is regarded as the reference path so that no processing path is provided for receive path 9. Taking processing path 1 as an example, the receive signal arrives at an optional adaptive filter 836 for filtering purposes as explained above. The possibly filtered receive signal is forwarded to a correlator 837. As in the context of FIG. 8, the correlator could also be another type of cross-analyzer, such as a phase detector. A second input to the correlator 837 is provided by the reference receive signal. The reference receive signal may optionally be filtered by an adaptive filter 816. A signal splitter distributes the reference receive signal to the plurality of processing paths. Note that the splitter distributes the reference receive signal also to processing paths 3 to 8 and 10 to 14 which are not illustrated in FIG. 9. The correlator 837 compares the receive signal and the reference receive signal. The correlator 837 produces a value for the receive signal relationship, such as a relative phase $\mathrm{phi}_{rel}$.

The calibration system further comprises a function fitting module 839 which is connected to the output of the correlators 837 in the plurality of processing paths. The function fitting unit 839 uses instantaneous values of the receive signal relationships for the plurality of non-reference receive paths as samples for fitting a function through the instantaneous values. The function may be, for example, a straight line with a certain slope and offset. If we take the relative phase $\mathrm{phi}_{rel}$ as an example, the function can be assumed to be a straight line. Referring to FIGS. 4 to 6, it can be seen that the measured values for the reference phase more or less follow a straight line. Note that one is mostly interested in knowing and determining relative differences between the plurality of receive paths. Therefore, the distribution of the measured values around the theoretically correct values indicated by the fitted function can be assumed to be symmetrically distributed around the fitted function. The function fitting module 839 generates estimated relationships for the plurality of processing paths. In each of the plurality of processing paths the receive signal relationship is subtracted from the corresponding estimated relationship at subtractor 841, 842, 845, and 846. The subtractors 841, 842, 845, and 846 generate values for deviations of the receive signal relationships from the estimated relationships DEV.1, DEV.2, DEV.15, and DEV.16. Similar structures and processing takes place in the other non-reference receive paths 3 to 8 and 10 to 14.

The function fitting module 839 may use, for example, a least mean square (LMS) method to determine the fitted function.

An averager, such as averager 738 in FIG. 8, may be provided either at the output of the correlator 837 or at the output of the subtractor 841, in the case of processing path 1. The same applies to the other processing paths of the plurality of processing paths.

Figure 10:
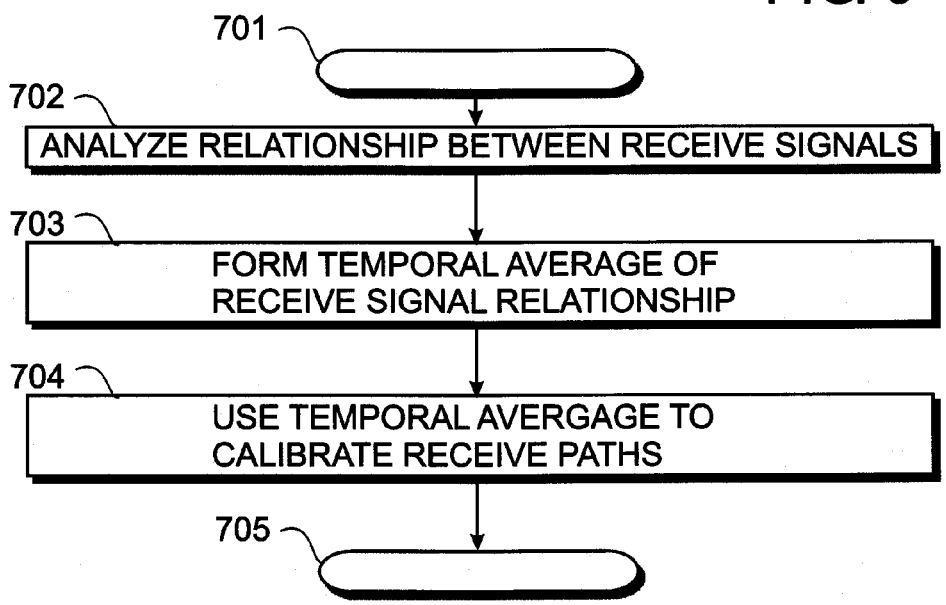
FIG. 10 shows a schematic flowchart of a method for calibration of a plurality of receive paths according to the teachings disclosed herein.

FIG. 10 shows an overview of the method according to one aspect of this disclosure. The method starts at step 701. In step 702, the relationship between the plurality of receive signals is (cross-)analyzed. Typically, one of the plurality of receive paths will be regarded as a reference receive path and the analysis of the relationship between receive signals is then performed for the reference receive path with each one of the other (non-reference) receive paths. It is possible to use an individual one of the receive paths as a reference path.

In step 703, a temporal average is formed on the basis of the receive signal relationship for one of the receive paths. This is repeated (or performed simultaneously) for all of the non-reference receive paths, so that a temporal average is available for each receive signal relationship and for each non-reference receive path.

The temporal averages are used, in step 704, to calibrate the receive paths. A possible rationale behind using the temporal averages for calibrating the receive paths may be summarized as follows: If everything is random (i.e. the movement of the users in the cell, and consequently the angle of arrival and the relative phase between the receive signals), then the only non-random portion of an observation must be a systematic deviation between the plurality of receive paths.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a central processing unit ("CPU"), micro processor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer useable (e.g. readable) medium configured to store the software. Such software can enable, for example, the function, fabrication, modelling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer useable medium such as semiconductor, magnetic disc, or optical disc (e.g., CD-ROM, DVD-ROM, etc.). The software can also be disposed as computer data embodied in a non-transitory computer useable (e.g. readable) transmission medium (e.g., solid state memory any other non-transitory medium including digital, optical, analogue-based medium, such as removable storage media). Embodiments of the present invention may include methods of providing the apparatus described herein by providing software describing the apparatus and subsequently transmitting the software as a computer data signal over a communication network including the internet and intranets.

It is understood that the apparatus and method describe herein may be included in a semiconductor intellectual property core, such as a micro processor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. An antenna array for a mobile communications system comprising:
    a plurality of receive paths, an individual one of the receive paths being connected between an antenna element and an analogue-to-digital converter, the analogue-to-digital converter digitizing a receive signal to form a digitized receive signal,
    a calibration signal processor connected to the analogue-to-digital converters of the plurality of the receive paths, wherein the calibration signal processor comprises
    a cross-analyzer for cross-analyzing the digitized receive signals of the plurality of receive paths with each other,
    an averager for forming a temporal average of an output of the cross-analyzer, the temporal average indicating a receive signal relationship between the digitized receive signals of the plurality of receive paths, and
    a comparator for comparing the receive signal relationship with a predetermined relationship and for determining a deviation between the receive signal relationship and the predetermined relationship,
    wherein the calibration signal processor is adapted to define a reference receive path and to use the temporal average of the receive signal relationship to calibrate of at least one of the plurality of receive paths.

2. The antenna array of claim 1, wherein the antenna elements are equally spaced, preferably by a distance equal to or greater than half a wavelength of the receive signal.

3. The antenna array of claim 1, wherein the receive signal relationship comprises at least one of a phase relation between the receive paths and an amplitude relation between the receive paths.

4. The antenna array of claim 1, wherein the calibration signal processor is adapted to use the deviation as a correctional value to correct the calibration of at least one of the at least two receive paths.

5. The antenna array of claim 1, wherein the calibration signal processor further comprises an estimator for estimating the predetermined relationship.

6. The antenna array of claim 5, wherein the estimator comprises a function fitting module for fitting a plurality of receive signal relationships between the reference path and other ones of the receive paths, and for estimating the predetermined relation based on a function parameter of a function fitted to the plurality of receive signal relationships.

7. The antenna array of claim 1 further comprising an adaptive filter for removing effects of at least one of a gain ripple and a phase ripple of analogue filters in the plurality of receive paths.

8. The active antenna array of claim 1, wherein the calibration signal processor further comprises an calibration initiator adapted to determine an amount of randomness in the receive signals, to initiate a calibration process if the amount of randomness exceeds a predefined initiation threshold, and to suspend the calibration process if the amount of randomness is lower than a predefined suspension threshold.

9. The active antenna array of claim 8, wherein the calibration initiator is adapted to evaluate a number of users currently being in communication with the antenna array.

10. A method for calibrating a plurality of receive paths carrying receive signals comprising:
    digitizing the receive signals to form digitized receive signals,
    cross-analyzing the digitized receive signals of the plurality of receive paths with each other,
    forming a temporal average of a result of the cross-analyzing, the temporal average indicating a receive signal relationship between the digitised receive signals of the plurality of receive paths,
    defining a reference receive path using the temporal average of the receive signal relationship to calibrate of at least one of the at least two receive paths,
    comparing the receive signal relationship with a predetermined relationship; and
    determining a deviation between the receive signal relationship and the predetermined relationship.

11. The method of claim 10, wherein the receive signals are received via an antenna array having antenna elements that are equally spaced, preferably by a distance equal to or greater than half a wavelength of the receive signal.

12. The method of claim 10, wherein the receive signal relationship comprises at least one of a phase relation between the plurality of receive paths and an amplitude relation between the plurality of receive paths.

13. The method of claim 10, further comprising:
    using the deviation as a correctional value to correct the calibration of the plurality of the receive paths.

14. The method of claim 10, further comprising:
    estimating the predetermined relationship.

15. The method of claim 14, wherein the plurality of receive paths comprises a reference path, the method further comprising:
    fitting a plurality of receive signal relationships to a function, and
    estimating the predetermined relationship based on a function parameter of a function fitted to the plurality of receive signal relationships.

16. The method of claim 10, further comprising filtering the receive signals by means of an adaptive filter for removing the effects of at least one of a gain ripple and a phase ripple of analogue filters in the plurality of receive paths.

17. The method of claim 10, further comprising:
    determining an amount of randomness in the receive signals,
    initiating the calibration if the amount of randomness exceeds a predefined initiation threshold, and
    suspending the calibration if the amount of randomness is lower than a predefined suspension threshold.

18. The method of claim 17 wherein the initiating or the suspension is based on an evaluation of a number of user currently being in communication with the antenna array.

19. A computer program product comprising a non-transitory computer-usable medium having control logic stored therein for causing a computer to manufacture an antenna array for a mobile communications network comprising:
- a plurality of receive paths, an individual one of the receive paths being connected between an antenna element and an analogue-to-digital converter, the analogue-to-digital converter digitizing a receive signal to form a digitized receive signal,
- a calibration signal processor connected to the analogue-to-digital converters of the plurality of the receive paths, wherein the calibration signal processor comprises
- a cross-analyzer for cross-analyzing the digitized receive signals of the plurality of receive paths with each other,
- an averager for forming a temporal average of an output of the cross-analyzer, the temporal average indicating a receive signal relationship between the digitized receive signals of the plurality of receive paths, and
- a comparator for comparing the receive signal relationship with a predetermined relationship and for determining a deviation between the receive signal relationship and the predetermined relationship, wherein the calibration signal processor is adapted to define a reference receive path and to use the temporal average of the receive signal relationship to calibrate of at least one of the plurality of receive paths.

20. A computer program product comprising a non-transitory computer-usable medium having control logic stored therein for causing an antenna to execute a method for calibrating a plurality of individual radio signals comprising:
- digitizing the digitized receive signals to form digitized receive signals,
- cross-analyzing the receive signals of the plurality of receive paths with each other,
- forming a temporal average of a result of the cross-analyzing, the temporal average indicating a receive signal relationship between the digitized receive signals of the plurality of receive paths,
- defining a reference receive path,
- using the temporal average of the receive signal relationship to calibrate of at least one of the at least two receive paths, and
- comparing the receive signal relationship with a predetermined relationship and for determining a deviation between the receive signal relationship and the predetermined relationship.

* * * * *